US010480660B2

(12) United States Patent
Abouelleil et al.

(10) Patent No.: US 10,480,660 B2
(45) Date of Patent: Nov. 19, 2019

(54) POSITIVE HUB SEAL

(71) Applicant: Mueller International, LLC, Atlanta, GA (US)

(72) Inventors: Ashraf Abouelleil, Oswego, IL (US); Steve Sharp, Naperville, IL (US)

(73) Assignee: Mueller International, LLC, Atlanta, GA (US)

( * ) Notice: Subject to any disclaimer, the term of this patent is extended or adjusted under 35 U.S.C. 154(b) by 1 day.

(21) Appl. No.: 15/720,153

(22) Filed: Sep. 29, 2017

(65) Prior Publication Data
US 2019/0101214 A1 Apr. 4, 2019

(51) Int. Cl.
*F16K 1/226* (2006.01)
*F16K 25/00* (2006.01)
*F16K 1/22* (2006.01)

(52) U.S. Cl.
CPC ............ *F16K 1/2263* (2013.01); *F16K 1/222* (2013.01); *F16K 1/2261* (2013.01); *F16K 1/2265* (2013.01); *F16K 1/2268* (2013.01); *F16K 25/00* (2013.01)

(58) Field of Classification Search
CPC ...... F16K 1/2263; F16K 1/222; F16K 1/2261; F16K 25/00; F16K 1/226
USPC .......................... 251/306, 305, 314, 316, 317
See application file for complete search history.

(56) References Cited

U.S. PATENT DOCUMENTS

| 4,289,297 A | * | 9/1981 | Nakanishi | F16K 1/2265 251/306 |
| 5,360,030 A | * | 11/1994 | Sisk | F16K 1/2265 137/375 |
| 5,695,170 A | * | 12/1997 | Dernovsek | F16K 1/2265 251/305 |
| 2009/0039305 A1 | * | 2/2009 | Shakagori | F16K 1/222 251/306 |

OTHER PUBLICATIONS

Henry Pratt Company; Brochure for AWWA Butterfly Valves 3"-20", published Apr. 2016, 12 pgs.
Henry Pratt Company; Operating Manual for 3"-20" Bonded Seat Butterfly Valves, published Jan. 2017, 9 pgs.

* cited by examiner

*Primary Examiner* — Kevin F Murphy
*Assistant Examiner* — Kelsey E Cary
(74) *Attorney, Agent, or Firm* — Taylor English Duma LLP (57) ABSTRACT

A valve includes: a valve body defining a shaft bore therethrough, an axis of the shaft bore defining a vertical axis; a valve shaft positioned within and configured to rotate within the valve body; a valve disc coupled to the valve shaft and positioned within the valve body, the valve disc configured to rotate within the valve body between an open position and a closed position; and a valve seat positioned within the valve body, the valve seat including an outer surface in contact with the valve body and an inner surface in contact with the valve disc, the inner surface of the valve seat defining a sealing ridge extending radially inward with respect to the vertical axis, the sealing ridge having an annular shape about the valve shaft, the sealing ridge concentric with the valve shaft.

20 Claims, 5 Drawing Sheets

POSITIVE HUB SEAL

TECHNICAL FIELD

Field of Use

This disclosure relates to valves used in fluid systems. More specifically, this disclosure relates to valve seals.

Related Art

Certain types of valves, such as butterfly valves in fluid systems, can comprise a valve shaft to actuate a mechanism for opening and closing the valve or otherwise adjusting a flow rate through the valve. Mechanisms for actuating can comprise, for example, a valve disc. For butterfly valves, opening and closing the valve comprises rotating the valve disc. To prevent leakage of the valve, various structures and methods have been used to seal the interface between moving parts of the valve such as, for example and without limitation, the valve disc and stationary parts of the valve such as the valve body, which can include a hub. Leakage from the valve can result in problems such as, for example and without limitation, costly repairs of the fluid system, contamination of surrounding air and soil, or even dangerous conditions for those nearby.

SUMMARY

It is to be understood that this summary is not an extensive overview of the disclosure.

This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve comprising: a valve body defining a shaft bore therethrough, an axis of the shaft bore defining a vertical axis; a valve shaft positioned within and configured to rotate within the valve body; a valve disc coupled to the valve shaft and positioned within the valve body, the valve disc configured to rotate within the valve body between an open position and a closed position; and a valve seat positioned within the valve body, the valve seat comprising an outer surface in contact with the valve body and an inner surface in contact with the valve disc, the inner surface of the valve seat defining a sealing ridge extending radially inward with respect to the vertical axis, the sealing ridge having an annular shape about the valve shaft, the sealing ridge concentric with the valve shaft.

In a further aspect, disclosed is a valve seat comprising: an outer surface; and an inner surface opposite from the outer surface, the inner surface defining a valve seat bore extending through the valve seat, the inner surface of the valve seat defining a sealing ridge, the sealing ridge extending radially inward and defining a radiused peak surface, the sealing ridge having an annular shape about the valve shaft, the sealing ridge concentric with the valve shaft.

In yet another aspect, disclosed is a method of using a valve, the method comprising: rotating a valve disc of the valve, the valve comprising: a valve body defining a shaft bore and an interior cavity, an axis of the shaft bore defining a vertical axis; a valve shaft positioned within and configured to rotate within the interior cavity of the valve body; the valve disc coupled to the valve shaft; and a valve seat positioned within the valve body, the valve seat comprising an outer surface in contact with the valve body and an inner surface in contact with the valve disc, the inner surface of the valve seat defining a sealing ridge extending radially inward, the sealing ridge having an annular shape about the valve shaft, the sealing ridge concentric with the valve shaft; contacting the sealing ridge of the valve seat with an axial end of the valve disc, the axial end of the valve disc defined with respect to the vertical axis; and compressing the sealing ridge.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially, " it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements of the valve disclosed herein, the conventions of "top," "bottom," "inner," "outer," "inside," or "outside," may be referenced. Unless stated otherwise here or in the figures, "top" describes that side or end of the valve that is facing upward as shown in the figures and "bottom" is that side or end of the valve that is opposite or distal the top of the valve and is facing downward as shown in the figures. Likewise, "outer" describes that side of the valve that is facing outward and "inner" is that side of the valve that is facing inward.

In some aspects, a valve seat and associated methods, systems, devices, and various apparatuses are disclosed herein. In some aspects, the valve seat can comprise a sealing ridge proximate to a shaft bore of a valve comprising the valve seat.

Figure 1:
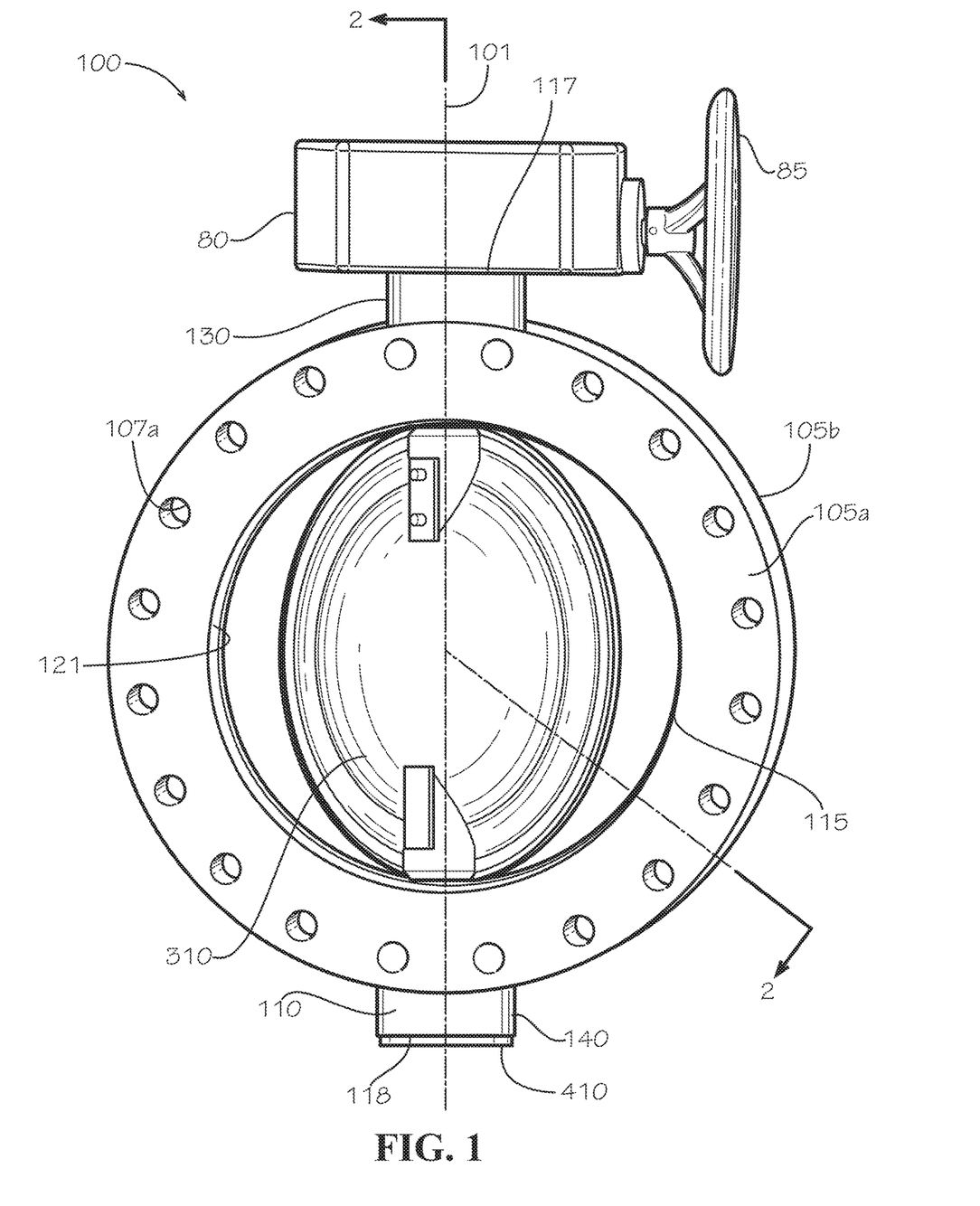
FIG. 1 is a side view of a valve comprising a shaft blowout prevention device in accordance with one aspect of the current disclosure.

FIG. 1 discloses a valve 100. In some aspects, the valve 100 can be a butterfly valve. In other aspects, the valve 100 can be one of various other types of valves including, but not limited to, a ball valve, a plug valve, or a cone valve, which can be configured to seal against an internal fluid pressure of as much as 200 psig or higher. In some aspects, the valve 100 can be a butterfly valve having a single-shaft or through-shaft design. The fluid itself can be any one of a number of different fluid media including a gas such as air or a liquid such as water. The fluid can be flammable, non-flammable, explosive, or non-explosive.

Figure 2:
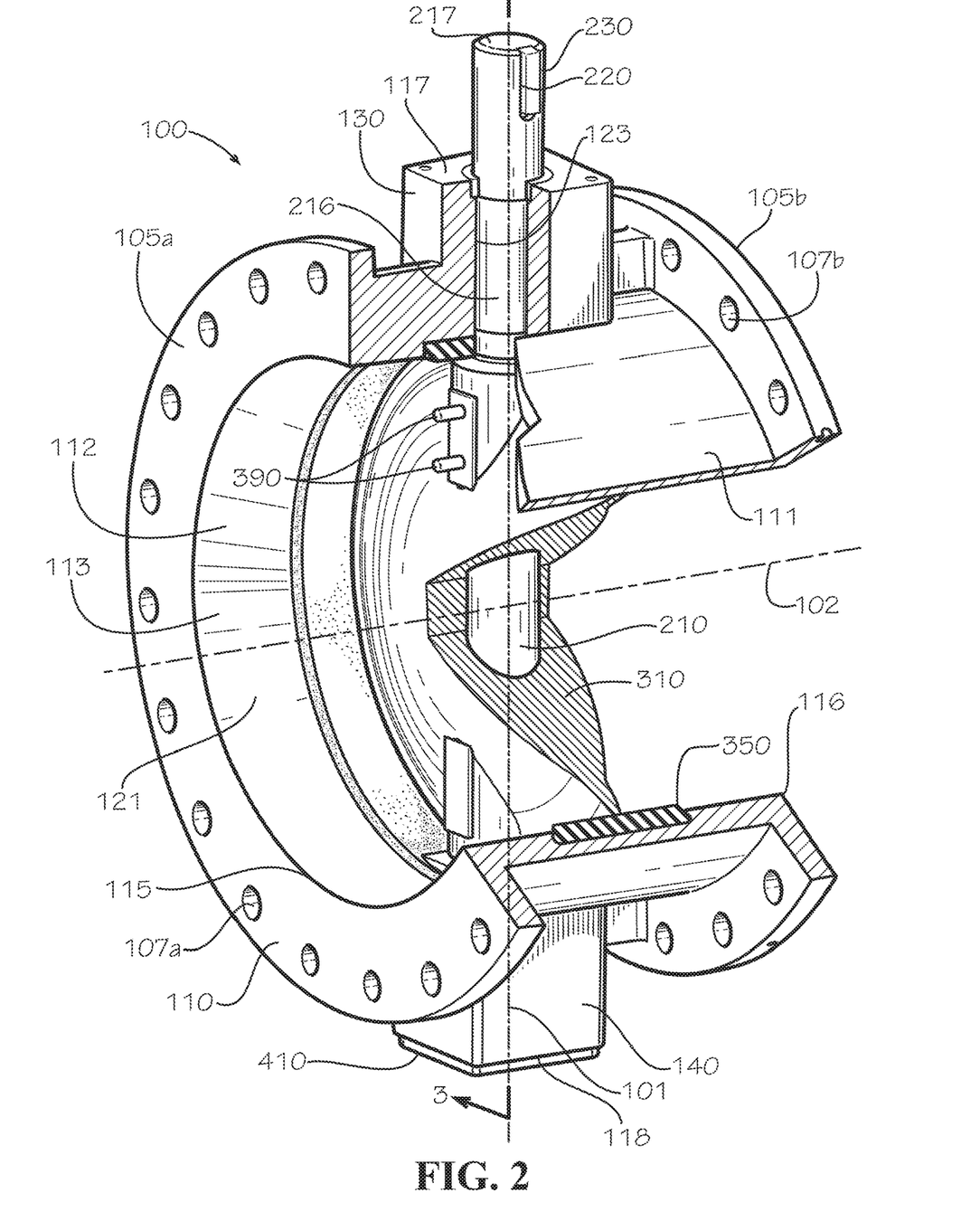
FIG. 2 is a perspective cutaway view of the valve of FIG. 1 taken along line 2-2 of FIG. 1.

The valve 100 can comprise a valve body 110 and a valve shaft 210 (shown in FIG. 2). The valve 100 can further comprise a valve disc 310 positioned within a fluid bore 121 of the valve body 110 through which fluid can pass. The valve 100 can further comprise an actuator 80 for rotating the valve shaft 210 within the valve body 110 to turn the valve disc 310 and thereby open the valve 100 to an open position or close the valve 100 to a closed position or to otherwise the adjust the flow of fluid through the valve 100. The valve body 110, the valve shaft 210, and the valve disc 310 can be aligned along a vertical axis 101 during assembly of the valve 100. In some aspects, the actuator 80 can comprise either a handwheel operator 85 as shown, a lever operator (not shown), or a gear operator (not shown). In other aspects, the valve 100 can be made to open or close by pneumatic or electrical power or any other suitable method. The valve 100 can further define a main axis 102 (shown in FIG. 2).

In some aspects, as in a typical butterfly valve, the valve disc 310 of the valve 100 can be configured to rotate a quarter of a turn between a fully open position and a fully closed position. In a typical butterfly valve, a radial cross-section of a valve disc such as the valve disc 310 can be configured to remain in the path of the fluid traveling through the valve 100 even when the valve 100 is open. In other aspects, the type of valve, the rotation angle or rotation angle range, or the particular valve configuration can differ from that shown.

The valve body 110 can define an inlet 115, an outlet 116 (shown in FIG. 2) distal from the inlet 115, a top end 117, a bottom end 118 distal from the top end 117, the fluid bore 121 defined between the inlet 115 and the outlet 116, and a shaft bore 123 (shown in FIG. 2) defined in the top end 117 and the bottom end 118. In some aspects, the shaft bore 123 can comprise a first portion 124 (shown in FIG. 3) defined in the top end 117 of the valve body 110 and a second portion 125 (shown in FIG. 3) defined in the bottom end 118 of the valve body 110. In some aspects, the fluid bore 121 and the shaft bore 123 can be cylindrical in shape.

In some aspects, as shown in FIGS. 1 and 2, the valve body 110 can be a "flanged" type valve body comprising an attachment flange 105a,b on each axial end of the valve 100—relative to the main axis 102—for attaching the valve to a piping system. Each of the attachment flanges 105a,b can respectively define a plurality of attachment holes 107a,b (107b shown in FIG. 2) through which a plurality of fasteners, including but not limited to nuts and bolts, can secure the valve 100 to the piping system. The valve body 110 may also be constructed as, for example and without limitation, a "lugged" type, a "wafer" type, or a "butt-weld" type valve. A "lugged" type valve comprises multiple lugs through which a plurality of fasteners can secure the valve 100 to the piping system, and a "wafer" type valve comprises neither lugs nor attachment flanges but is sandwiched between opposing flanges on the adjacent piping components of the piping system in which it is installed. A "butt-weld" type valve does not require fasteners for assembly to the piping system but is instead welded in place.

As shown in FIG. 2, the valve body 110 can further comprise an outer surface 111 and an inner surface 112, which can define an interior cavity 113. In some aspects, the valve 100 can comprise a liner (not shown) lining the fluid bore 121 of the valve body 110 and extending from the inlet 115 to the outlet 116. The valve 100 can comprise a seat 350 against which the valve disc 310 can seal. In some aspects, the valve body 110 can further comprise a top trunnion 130 and a bottom trunnion 140. In some aspects, the actuator 80 can be assembled to the top trunnion 130. In other aspects, a bottom cover 410 can be assembled to the bottom trunnion 140 with a plurality of fasteners 490 (shown in FIG. 3) extending through a plurality of attachment bores 418 (shown in FIG. 3). In other aspects, the bottom cover 410 can be assembled to the bottom trunnion 140 by other methods, such as by a single fastener 490 or by welding.

The valve body 110 can be cast from any one or more of a number of different metals or metal alloys including, for example and without limitation, stainless steel, carbon steel, ductile iron, and various steel and non-steel alloys including INCOLLOY alloys, MONEL alloys, HASTELLOY alloys, INCONEL alloys, and chrome moly alloys. The valve body 110 can also be machined.

In some aspects, the valve shaft 210 can be positioned at least partially within the shaft bore 123 of the valve body 110. For example and without limitation, a portion of the valve shaft 210 proximate to a top end 217 of the valve shaft 210 can be positioned within the first portion 124 of the shaft bore 123, and a portion of the valve shaft 210 proximate to a bottom end 218 (shown in FIG. 3) of the valve shaft 210 can be positioned within the second portion 125 of the shaft bore 123. In other aspects, the valve 100 can comprise an upper valve shaft (not shown) positioned at least partially within the first portion 124 of the shaft bore 123 of the valve body 110 and secured to a top of the valve disc 310 and a lower valve shaft (not shown) can be positioned within the second portion 125 of the shaft bore 123 and secured to the bottom of the valve disc 310.

In some aspects, the valve shaft 210 can be coupled to the valve disc 310 with a fastener 390 such as, for example and without limitation, a press-fit shaft pin. In other aspects, the valve shaft 210 can be coupled to the valve disc 310 with more than one fastener 390. The valve shaft 210 can define a pin bore 295 or multiple pin bores 295 (shown in FIG. 3), which can each be sized to receive one of the fasteners 390. Likewise, the valve disc 310 can define a pin bore 395 or multiple pin bores 395 (shown in FIG. 3), which can each be sized to receive a one of the fasteners 390. The valve shaft 210 can further define a keyway 220 that is sized to receive a key 230 for engagement with the actuator 80.

Figure 3:
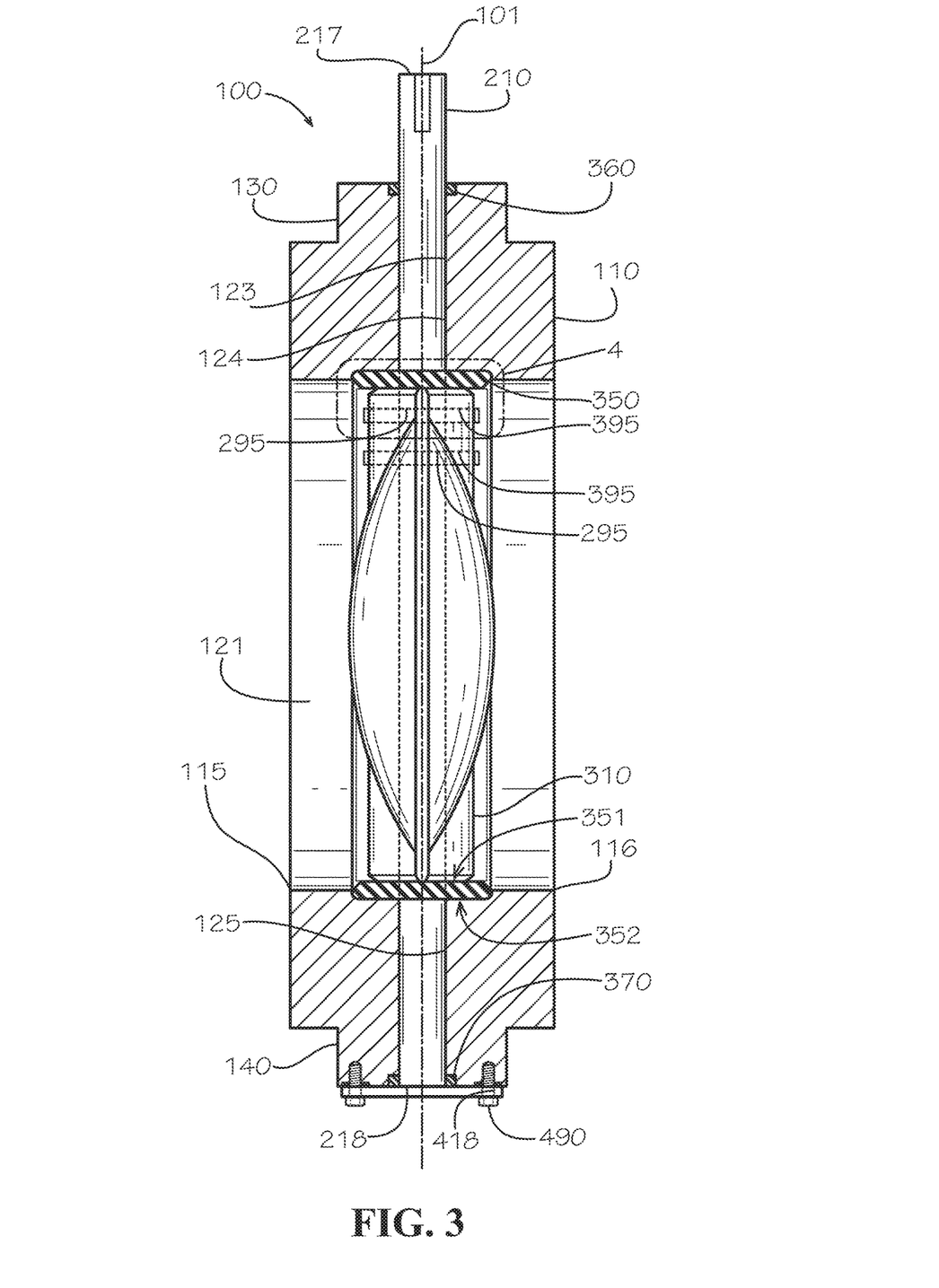
FIG. 3 is a partial sectional view of the valve of FIG. 1 taken along line 3-3 of FIG. 2 in accordance with another aspect of the current disclosure.

In other aspects, as shown in FIG. 3, the valve 100 can further comprise the seat 350 against which the valve disc 310 can seal when the valve 100 is in a fully closed position. The seat 350 can have an annular shape that extends circumferentially around the fluid bore 121, in contact with the inner surface 112 and, at least when the valve 100 is in the fully closed position, in contact with the valve disc 310. In other aspects, the seat 350 can be always in contact with the valve disc 310 at a top and at a bottom of the valve disc 310 proximate to the connection between the valve shaft 210 and the valve disc 310. The seat 350 can comprise an inner surface 351 in contact with the valve disc 310 and an outer surface 352 in contact with the valve body 110 and opposite from the inner surface 351. In some aspects, as shown, the seat 350 can be bonded to the valve body 110 using a process such as, for example and without limitation, a thermal bonding process. In other aspects, the seat 350 can be bonded to the valve body 110 using a fastener such as, for example and without limitation, an adhesive.

In some aspects, the valve 100 can further comprise an upper shaft seal 360 and a lower shaft seal 370. More specifically, the upper shaft seal 360 and the lower shaft seal 370 can seal a circumferential gap defined between the shaft bore 123 and the valve shaft 210 at the respective top end 117 and bottom end 118 of the valve 100 such that fluid from inside the fluid system cannot travel around the top end 217 or the bottom end 218 of the valve shaft 210 or exit from the top end 117 or the bottom end 118 of the valve 100. Either or both of the upper shaft seal 360 and the lower shaft seal 370 can comprise a V-packing seal.

In a typical valve, the valve disc 310 can only rotate within the fluid bore 121 of the valve body 110 or, during service, can be removed through the fluid bore 121. In some aspects of a typical valve, the fasteners 390 keep the valve shaft 210 inside the shaft bore 123. In other aspects, the bottom cover 410 and the force of gravity pulling the bottom end 218 of the valve shaft 210 against the bottom cover 410—in a valve 100 that is installed with the top end 117 above the bottom end 118—keep the valve shaft 210 inside the shaft bore 123. In other aspects, the bottom cover 410 functions as a pressure boundary to keep the fluid from leaking out of the valve 100.

During use of the fluid system, fluid inside the fluid system and inside the valve 100 can leak into a space between the valve disc 310 and the seat 350 and subsequently into a space or gap defined between the shaft bore 123 and the valve shaft 210. Even when the upper shaft seal 360 is present, such leakage can eventually cause the fluid to leak past the upper shaft seal 360 and from the valve 100. As typically configured, the seat 350 provides only a passive seal that typically cannot prevent fluid into the space or gap between the shaft bore 123 and the valve shaft 210 and therefore at best can only reduce the amount of fluid that enters therein. This can be called a "wet seal" because fluid is allowed past the intersection of the valve disc 310 and the seat 350. In some aspects, including when high fluid pressures are experienced inside the valve 100, the valve 100 can leak into such a space or out of the valve 100 if the material forming the seat 150 or other components of the valve 100 do not fall within dimensional tolerances. The valve 100 described herein, however, can overcome this and other issues.

Figure 4:
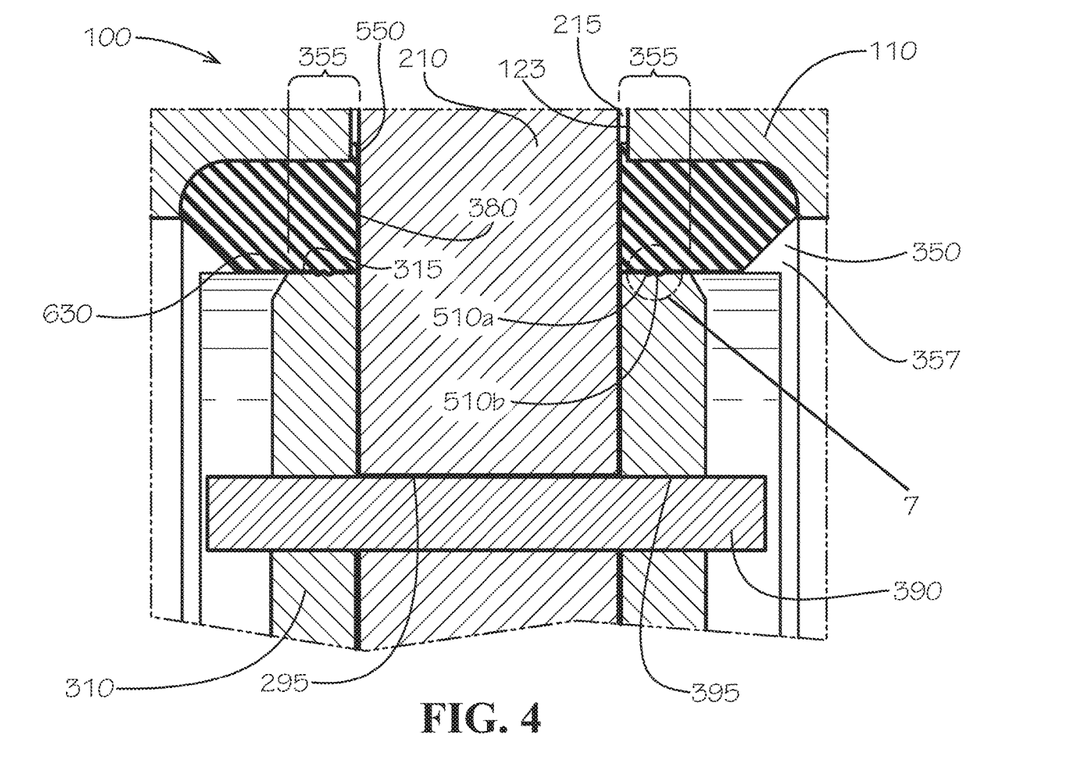
FIG. 4 is a detail view of the valve of FIG. 1 taken from detail 4 of FIG. 3.

As shown in FIG. 4, the valve 100 can comprise a seat such as the seat 350, which can be configured to provide an active seal with the valve disc 310. An active seal is provided when the seal is positively compressed against the mating part. A valve 100 with an active seal as described herein can also be described as having a "dry seal" or a "dry hub" because the space between the valve shaft 210 and the valve body 110 can be kept dry. In some aspects, an active seal is possible by introducing interference between mating parts such as the seat 350 and the valve disc 310 such that the seat 350, for example and without limitation, is compressed to be able to fit the valve disc 310 inside the seat 350 while the seat 350 itself is installed inside the valve body 110. As shown, the interaction between the seat 350 and the valve disc 310 of the valve 100 can comprise both a passive seal and an active seal over a total seal area 355. In some aspects, the total seal area 355 can extend from a valve seat bore 380 of the seat 350 to a seal boundary 630 defined by an edge of the mating part, which in this case can be an axial end 315 of the valve disc 310, where the axial end of the valve disc 310 is defined with respect to the vertical axis 101 of the valve 100. In other aspects, the total seal area 355 can be defined by interaction between the seat 350 and the part of the valve 100 against which the seat 350 seals, which can be less than or greater than the total seal area 355 shown.

Where the seat 350 is in contact with the valve disc 310 but not positively compressed, the valve 100 can comprise a passive seal. Where the seat 350 is compressed at and surrounding the location of a pair of sealing ridges 510a,b defined in the inner surface 351, for example, the valve 100 can comprise an active seal. The seat 350 can further comprise a flange 550 extending axially relative to the vertical axis 101 from the outer surface 352 into a space 215 defined between the shaft bore 123 and the valve shaft 210. In other aspects, a bushing 216 (shown in FIG. 2) can at least partially fill the space 215 between the shaft bore 123 and the valve shaft 210. During operation of the valve 100, including when the valve disc 310 is stationary, each of the sealing ridges 510a,b can be compressed by the axial end 315 of the valve disc 310. As shown, the outer surface 352 of the seat 350 can otherwise be fixed and supported by the valve body 110, and the valve disc can be fixed and supported by the valve shaft 210 via the fastener 390. As shown, the axial end 315 of the valve disc 310 can define a surface facing the inner surface 351 of the seat 350 and in contact with the inner surface 351 of the seat 350. Furthermore, as shown, each of the surface defined by the axial end 315 of the valve disc 310 in cross-section and a portion of the inner surface 351 of the seat 350 in cross-section can be perpendicular to the vertical axis 101 of the valve body 110. Also as shown, an entirety of the inner surface 351 of the seat 350 that is in contact with the surface of the valve disc 310, except at least for the sealing ridges 510a,b, can be in cross-section perpendicular to the vertical axis 101 of the valve body 110.

In some aspects, as shown in FIG. 4, the aforementioned interference between the seat 350 in a natural position and the valve disc 310 can be made equal to a height 715 (shown in FIG. 7) of the sealing ridge 510a,b. The height 715 can be described as a maximum height of the sealing ridge 510a,b. In other aspects, the interference between the seat 350 in its natural position and the valve disc 310 can be made less than the height 715 of the sealing ridge 510a,b by, for example and without limitation, making an outer diameter of the valve disc 310 smaller, making an inner diameter of the seat 350 larger, or making the height 715 shorter. In yet other aspects, the interference between the seat 350 in its natural position and the valve disc 310 can be made greater than the height 715 of the sealing ridge 510a,b such that an entire axial length of the seat —relative to the main axis 102 —is compressed by, for example and without limitation, making the inner diameter of the seat 350 as measured to a first base portion 610 or a second base portion 620 of the seat 350 smaller than the outer diameter of the valve disc 310.

Figure 5:
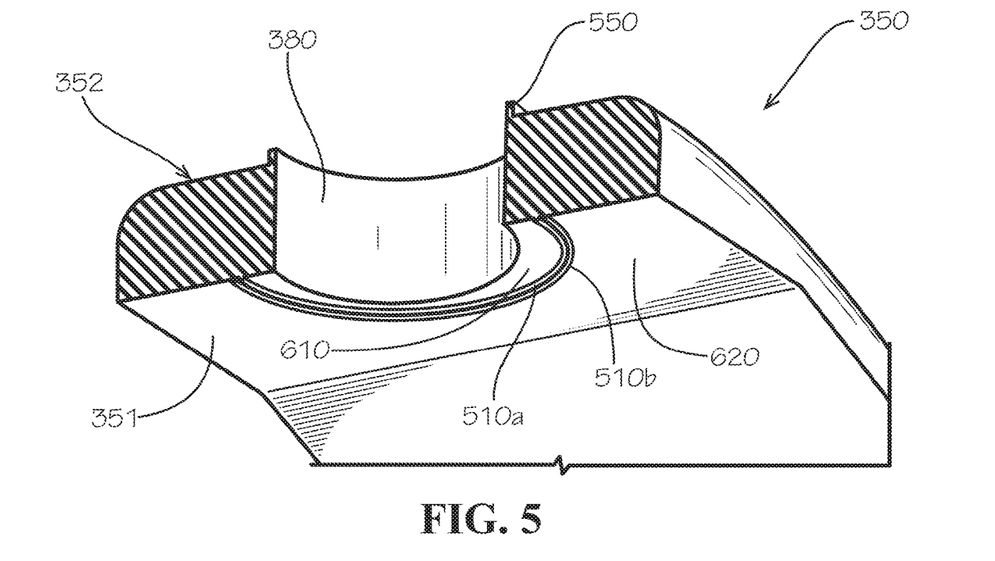
FIG. 5 is a bottom perspective cutaway view of a hub portion of a valve seat of the valve of FIG. 1.

In one aspect, the seat 350 can comprise a bevel 357, which can be a chamfered edge on an axial edge or end of the seat 350 relative to the main axis 102. In one aspect, a surface of the bevel 357 can be angled at 45 degrees with respect to the inner surface 351 (shown in FIG. 3). In another aspect, the surface of the bevel 357 can be angled at greater than or less than 45 degrees with respect to the inner surface 351. In yet another aspect, as shown in FIG. 5, the seat 350 need not comprise the bevel 357. In various aspects, the bevel 357 can ease insertion of the valve disc 310 into the valve body 110 and general operation of the valve 100 such as when opening and closing the valve disc 310 causes a portion of the valve disc 310 to pass axial ends of the seat 350.

In one aspect, also as shown in FIG. 5, the seat 350 can comprise the pair of sealing ridges 510a,b. In other aspects, the seat 350 can define only a single sealing ridge 510a,b. In yet other aspects, the seat 350 can define three or more sealing ridges 510a,b. The sealing ridges 510a,b can extend radially inward relative to the main axis 102. The sealing ridges 510a,b can be annular in shape and further can lie concentric about the valve shaft 210 and the vertical axis 101. The seat 350 can define the valve seat bore 380, which can extend from the inner surface 351 to the outer surface 352. The valve seat bore 380 can be sized to receive the valve shaft 210.

Figure 6:
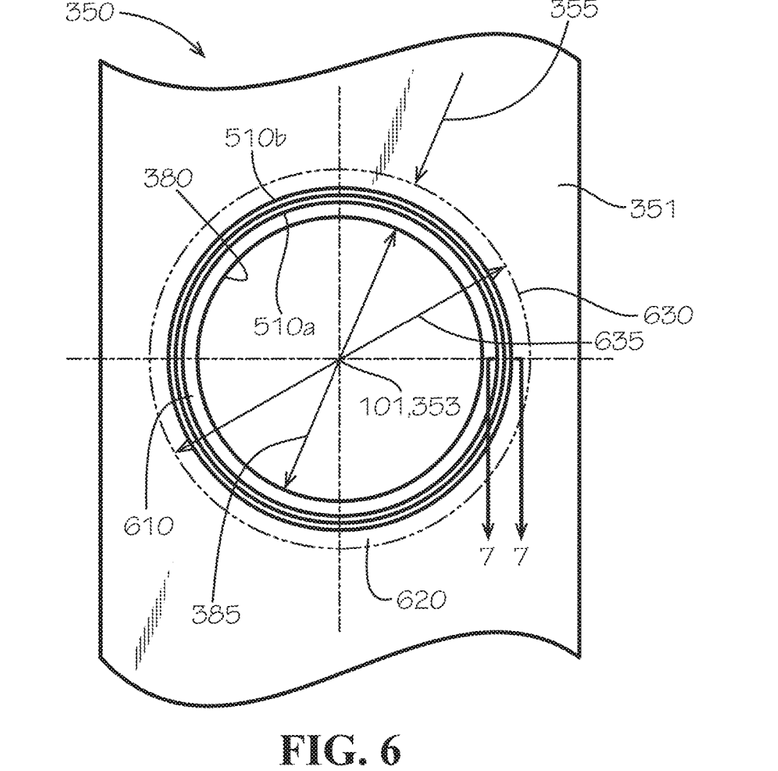
FIG. 6 is a bottom view of the hub portion of the valve seat of FIG. 5.

As shown in FIG. 6, the total seal area 355 can be divided into several portions. In some aspects, the total seal area 355 can comprise a first base portion 610, the first sealing ridge 510a, the second sealing ridge 510b, a second base portion 620, and the seal boundary 630. As shown, each of the first base portion 610 and the second base portion 620 can be a flat surface and can also be parallel to the main axis 102.

Figure 7:
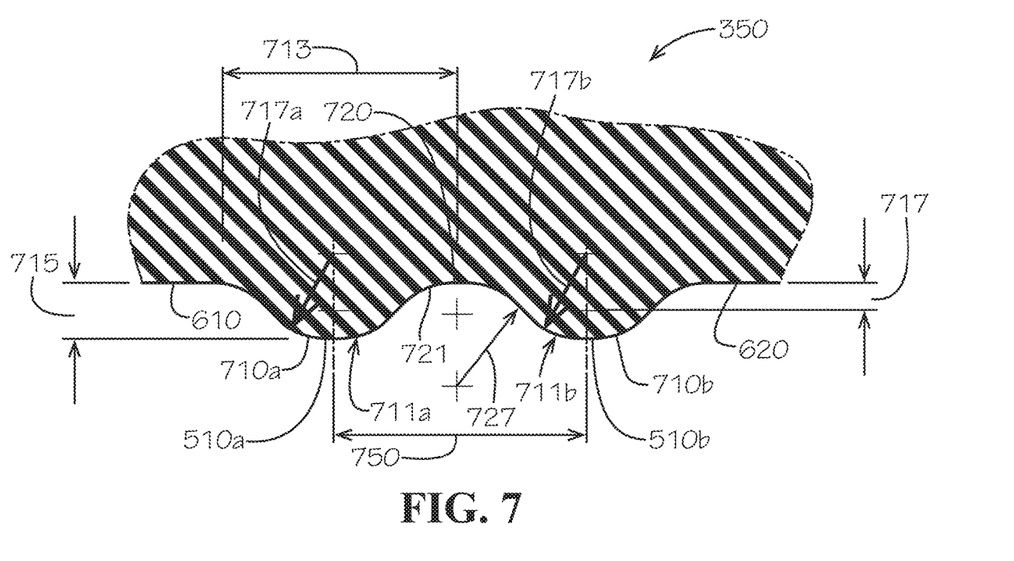
FIG. 7 is a detail view of a pair of sealing ridges of the valve seat of the valve of FIG. 1 taken from detail 7 of FIG. 4.

As shown in FIG. 7, each sealing ridge 510a,b can comprise a peak 710a,b. Each of the sealing ridges 510a,b can further comprise a peak surface 711a,b. In some aspects, including when the seat 350 is in a natural (i.e., non-deformed) state or condition, each of the peak surfaces 711a,b can be radiused in cross-section as shown, measuring respective radii 717a,b. In other aspects, the peak surfaces 711a,b can define a pointed shape, a parabolic shape, a square or plateau shape, or any other polygonal or curved shape in cross-section. The sealing ridges 510a,b can define a valley 720 therebetween, which can define a valley surface 721, or the seat 350 can define an additional base portion therebetween comprising a flat or other non-radiused surface (not shown). The valley 720 can define a radius 727. Each of the sealing ridges 510a,b can define a base width 713, the height 715, and a half height 717 measured from the respective first base portion 610 or the second base portion 620 to the inflection point or separation point between the peak surfaces 711a,b and the valley surface 721.

Each of the peaks 710a,b of the respective sealing ridge 510a,b can be offset in a radial direction with respect to the valve seat bore 353 from an edge of the valve seat bore 380. In some aspects, the respective sealing ridge 510a,b can be offset in a radial direction from an edge of the valve seat bore 380 by a distance greater than half of the base width 713 of the sealing ridge 510a,b, which can result in the first base portion 610 of the seat 350 extending from the first sealing ridge 510a to the valve seat bore 380. The valve seat bore 380 itself can define a diameter 385 (shown in FIG. 6). The second sealing ridge 510b of the two sealing ridges 510a,b can be offset radially with respect to the valve seat bore axis 353 from the first sealing ridge 510a of the two sealing ridges 510a,b by a ridge separation distance 750. In various aspects, each of the sealing ridges 510a,b of the seat 350 can be made concentric with the valve seat bore 380 and about a valve seat bore axis 353 (shown in FIG. 6). The second base portion 620 can extend from an edge of the second sealing ridge 510b to the seal boundary 630, which can define a seal boundary diameter 635.

In some aspects, the height 715 of each of the sealing ridges 510a,b can be between about 0.005 inches and about 0.015 inches. More specifically, the height 715 of each of the sealing ridges 510a,b can be about 0.010 inches. An overall diameter of the seat 350 at the peaks 710a,b of the sealing ridges 510a,b can thus be between about 0.010 inches and about 0.030 inches, and more specifically can be about 0.020 inches. In other aspects, the height 715 of each of the sealing ridges 510a,b can be outside of the range of about 0.005 inches to about 0.015 inches. The ridge separation distance 750 can be made equal to the base width 713 of a one of the first sealing ridge 510a and the second sealing ridge 510b.

In some aspects, the valve 100 can define a nominal outlet diameter of 4 to 20 inches. In other aspects, the nominal outlet diameter of the valve 100 as described herein can be less than 4 inches or more than 20 inches. In some aspects, the valve body 110 and other components of the valve 100 can be formed from a rigid material such as, for example and without limitation, ductile iron or steel. In some aspects, the seat 350 and other components of the valve 100 can be formed from a resilient material such as, for example and without limitation, Buna-N rubber.

In various aspects, a method of using the valve 100 can comprise rotating the valve disc 310 of the valve 100, contacting the sealing ridge 510a,b of the seat 350 with the axial end 315 (shown in FIG. 4) of the valve disc 310, and compressing the sealing ridge 510a,b. In some aspects, compressing the sealing ridge 510a,b can comprise compressing the sealing ridge 510a,b a distance equal to the height 715 of the sealing ridge 510a,b. As such, compressing the sealing ridge 510a,b can comprise reducing the height 715. In other aspects, rotating the valve disc 310 of the valve 100 can comprise sliding the axial end 315 of the valve disc 310 along the peak 710a,b of the sealing ridge 510a,b in a circular path. In yet other aspects, compressing the sealing ridge 510a,b can comprise preventing movement of fluid past the sealing ridge 510a,b from the interior cavity 113 (shown in FIG. 2) of the valve 100 to the shaft bore 123 of the valve 100.

In some aspects, in addition to the other benefits described herein, use of the disclosed seat 350 can result in reduced hub torque (i.e., the torque required to rotate the valve disc 310 between the open position and the closed position). In other aspects, the hub torque will remain constant and not increase even though a portion of the seat 350 is compressed during operation of the valve 100. In various aspects, increasing the hub torque will be undesirable due to the increased load on the actuator 80.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
    a valve body defining a shaft bore therethrough, an axis of the shaft bore defining a vertical axis;
    a valve shaft positioned within and configured to rotate within the valve body;
    a valve disc coupled to the valve shaft and positioned within the valve body, the valve disc configured to rotate within the valve body between an open position and a closed position, the valve disc defining an axial end; and
    a valve seat positioned within the valve body, the valve seat comprising an outer surface in contact with the valve body and an inner surface in contact with the valve disc, the inner surface of the valve seat defining a sealing ridge extending radially inward with respect to the vertical axis, the sealing ridge having an annular shape about the valve shaft, the sealing ridge concentric with the valve shaft, the axial end of the valve disc defining a surface facing the inner surface of the valve seat and in contact with the inner surface of the valve seat,
    each of an entirety of the surface of the valve disc and an entirety of the inner surface of the valve seat that is in contact with the surface of the valve disc except for the sealing ridge being perpendicular to the vertical axis of the valve body.

2. The valve of claim 1, wherein the sealing ridge is compressed by the axial end of the valve disc, the axial end of the valve disc defined with respect to the vertical axis.

3. The valve of claim 1, wherein interference between the sealing ridge in a natural position and the valve disc is equal to a maximum height of the sealing ridge.

4. The valve of claim 1, wherein the maximum height of the sealing ridge is between 0.005 inches and 0.015 inches.

5. The valve of claim 4, wherein the maximum height of the sealing ridge is about 0.010 inches.

6. The valve of claim 1, wherein the sealing ridge defines a radiused peak surface.

7. The valve of claim 1, wherein:
    the sealing ridge is a first sealing ridge;
    the inner surface of the valve seat defines a second sealing ridge extending radially inward, the second sealing ridge having an annular shape about the valve shaft, the second sealing ridge concentric with the valve shaft; and
    the first sealing ridge is offset radially with respect to the vertical axis from the second sealing ridge by a ridge separation distance.

8. The valve of claim 1, wherein the valve seat further comprises a flange extending axially along the vertical axis from the outer surface into a space defined between the shaft bore and the valve shaft.

9. A valve seat comprising:
    an outer surface; and
    an inner surface opposite from the outer surface, the inner surface defining a valve seat bore extending through the valve seat, the valve seat bore defining a valve seat bore axis, the inner surface of the valve seat defining a sealing ridge, the sealing ridge extending radially inward and defining a radiused peak surface, the sealing ridge having an annular shape about the valve seat bore, the sealing ridge concentric with the valve seat bore, an entirety of the inner surface of the valve seat that is configured to be in contact with a surface of an axial end of a valve disc except for the sealing ridge being perpendicular to the valve seat bore axis.

10. The valve seat of claim 9, wherein:

the sealing ridge is a first sealing ridge;

the inner surface of the valve seat defines a second sealing ridge extending radially inward, the second sealing ridge having an annular shape about the valve seat bore; and the second sealing ridge of the two sealing ridges is offset radially with respect to the vertical axis from a first sealing ridge by a ridge separation distance.

11. The valve seat of claim 10, wherein the ridge separation distance is equal to a base width of a one of the first sealing ridge and the second sealing ridge.

12. The valve seat of claim 10, wherein the valve seat further comprises a radiused valley surface between the first sealing ridge and the second sealing ridge.

13. The valve seat of claim 9, wherein a peak of the sealing ridge is offset in a radial direction from an edge of the valve seat bore by a distance greater than half a width of the sealing ridge.

14. The valve seat of claim 9, wherein the sealing ridge is concentric with the valve seat bore of the valve seat.

15. The valve seat of claim 9, wherein the maximum height of the sealing ridge is between 0.005 inches and 0.015 inches.

16. A method of using a valve, the method comprising:

rotating a valve disc of the valve, the valve comprising:

a valve body defining a shaft bore and an interior cavity, an axis of the shaft bore defining a vertical axis;

a valve shaft positioned within and configured to rotate within the interior cavity of the valve body;

the valve disc coupled to the valve shaft and defining an axial end, the axial end of the valve disc defined with respect to the vertical axis; and a valve seat positioned within the valve body, the valve seat comprising an outer surface in contact with the valve body and an inner surface in contact with the valve disc, the inner surface of the valve seat defining a sealing ridge extending radially inward with respect to the vertical axis, the sealing ridge having an annular shape about the valve shaft, the sealing ridge concentric with the valve shaft, the axial end of the valve disc defining a surface facing the inner surface of the valve seat and in contact with the inner surface of the valve seat, each of an entirety of the surface of the valve disc and an entirety of the inner surface of the valve seat that is in contact with the surface of the valve disc except for the sealing ridge being perpendicular to the vertical axis of the valve body;

contacting the sealing ridge of the valve seat with the axial end of the valve disc; and compressing the sealing ridge such that a maximum height of the sealing ridge is reduced.

17. The method of claim 16, wherein compressing the sealing ridge comprises compressing the sealing ridge a distance equal to the maximum height of the sealing ridge.

18. The method of claim 16, wherein rotating the valve disc of the valve comprises sliding the axial end of the valve disc along a peak of the sealing ridge in a circular path about the vertical axis.

19. The method of claim 16, wherein the sealing ridge in a natural position defines a radiused peak surface.

20. The method of claim 16, wherein compressing the sealing ridge comprises sealing around the shaft bore of the valve to prevent fluid flow past the sealing ridge from the interior cavity of the valve to the shaft bore of the valve, and wherein rotating the valve disc of the valve further comprises rotating the valve shaft within the shaft bore and within a flange of the valve seat, the flange extending axially along the vertical axis from the outer surface of the valve seat into a space defined between the shaft bore and the valve shaft.

* * * * *